US007779413B2

(12) United States Patent
Suzuki

(10) Patent No.: US 7,779,413 B2
(45) Date of Patent: Aug. 17, 2010

(54) METHOD OF ASSIGNING AVAILABLE RESOURCES FOR INTERNAL AND EXTERNAL USERS AT START TIME OF SCHEDULED TIME PERIOD BASED ON PROGRAM RESERVATIONS INFORMATION

(75) Inventor: Tomomi Suzuki, Yamato (JP)

(73) Assignee: Hitachi, Ltd., Tokyo (JP)

( * ) Notice: Subject to any disclaimer, the term of this patent is extended or adjusted under 35 U.S.C. 154(b) by 1427 days.

(21) Appl. No.: 11/145,452

(22) Filed: Jun. 3, 2005

(65) Prior Publication Data

US 2005/0283784 A1 Dec. 22, 2005

(30) Foreign Application Priority Data

Jun. 3, 2004 (JP) ............................. 2004-165576

(51) Int. Cl.
 *G06F 9/46* (2006.01)
(52) U.S. Cl. ...................................... 718/104; 718/102
(58) Field of Classification Search ................. 718/100, 718/101, 102, 104, 107, 103; 700/95, 99, 700/100
See application file for complete search history.

(56) References Cited

U.S. PATENT DOCUMENTS

| 2002/0069279 | A1 | 6/2002 | Romero et al. |
| 2004/0062264 | A1* | 4/2004 | Adams ........................ 370/432 |
| 2005/0060711 | A1* | 3/2005 | Ericsson et al. ............. 718/107 |

FOREIGN PATENT DOCUMENTS

JP 61-246843 A 11/1986

(Continued)

OTHER PUBLICATIONS

Sulistio et al. "A Grid Simulation Infrastructure Supporting Advance Reservation" 2004, Proceeding of the 16th International Conference on Parallel and Distributed Computing and Systems, pp. 1-7.*

(Continued)

*Primary Examiner*—Meng-Ai An
*Assistant Examiner*—Willy W Huaracha
(74) *Attorney, Agent, or Firm*—Townsend and Townsend and Crew LLP

(57) ABSTRACT

Necessary resources are assigned to programs based on a program reservation information management table in which each of the programs is associated with a necessary resource quantity for execution of the program and execution scheduled time period as program reservation information. When the program reservation information is entered through a terminal, a free resource quantity management table in which available resource quantities are associated with respective time periods is referred to, and it is determined whether the available resource quantity for the execution scheduled time period is at or above the necessary resource quantity. When having determined that the available resource quantity is at or above the necessary resource quantity, the necessary resource quantity is subtracted from the available resource quantity, and the subtracting result is written as a new value of the available resource quantity into the free resource quantity management table, and the program reservation information is written into the program reservation information management table.

9 Claims, 10 Drawing Sheets

FOREIGN PATENT DOCUMENTS

| | | | |
|---|---|---|---|
| JP | 06-282446 A | | 10/1994 |
| JP | 06282446 A | * | 10/1994 |
| JP | 07-334466 A | | 12/1995 |
| JP | 11275473 A | * | 10/1999 |
| JP | 2002-269062 | | 9/2002 |
| JP | 2002-318791 | | 10/2002 |
| JP | 2003-178040 A | | 6/2003 |
| JP | 2003-248739 A | | 9/2003 |
| JP | 2003248739 A | * | 9/2003 |

OTHER PUBLICATIONS

Japan Patent Office (JPO) office action for patent application JP2004-165576 (Mar. 10, 2008).

Della Maggiore et al. "Cisco Network Simplified," (Mar. 12, 2004).

Yoshimura et al. "Server Allocation Policy for Improving Response on Web Access Peaks," ((Sep. 1, 2002).

Japan Patent Office (JPO) office action dated Mar. 17, 2009 for JPO patent application JP2008-209131.

Japan Patent Office (JPO) office action for JPO patent application JP2008-209131 (Jun. 9, 2009).

* cited by examiner

| DATE | TIME | NUMBER OF MACHINES TO BE RESERVED | OPERATOR INFORMATION | PREMISE OS | PREMISE SOFTWARE |
|---|---|---|---|---|---|
| 1/10 | 12-14 | 2 | OPERATOR X | Linux (TRADEMARK) | J2EE1.4 ftp |
| 1/10 | 16-18 | 1 | OPERATOR X | Windows (TRADEMARK) | VB Excel (TRADEMARK) |
|  |  |  |  |  |  |

FIG. 2A

| DATE | TIME | NUMBER OF UNOCCUPIED MACHINES |
|---|---|---|
| 1/10 | 10-11 | 4 |
|  | 11-12 | 4 |
|  | 12-13 | 2 |
|  | 13-14 | 2 |
|  | 14-15 | 4 |
|  | 15-16 | 4 |
|  | 16-17 | 3 |
|  | 17-18 | 3 |
|  | 18-19 | 4 |
|  | 19-20 | 4 |

FIG. 2B

| PATTERN | PREMISE OS | PREMISE SOFTWARE | SYSTEM PREPARATION TIME |
|---|---|---|---|
| 1 | Linux (TRADEMARK) | J2EE1.4 ftp | 0.2 HOURS |
| 2 | Windows (TRADEMARK) | VB Excel (TRADEMARK) | 0.4 HOURS |
| 3 | : | : | : |

FIG. 2C

| COMPUTER | OPERATOR INFORMATION @12:48 |
|---|---|
| COMPUTER 31a | OPERATOR X |
| COMPUTER 31b | OPERATOR X |
| COMPUTER 31c | FREE |
| COMPUTER 31d | FREE |

FIG. 2D

| DATE | TIME | NUMBER OF UNOCCUPIED MACHINES |
|---|---|---|
| 1/10 | 10-11 | 4 |
| | 11-12 | 4 |
| | 12-13 | 2 |
| | 13-14 | 0 |
| | 14-15 | 2 |
| | 15-16 | 2 |
| | 16-17 | 1 |
| | 17-18 | 3 |
| | 18-19 | 4 |
| | 19-20 | 4 |

| DATE | TIME | NUMBER OF MACHINES TO BE RESERVED | OPERATOR INFORMATION | PREMISE OS | PREMISE SOFTWARE |
|---|---|---|---|---|---|
| 1/10 | 12 - 14 | 2 | OPERATOR X | Linux (TRADEMARK) | J2EE1.4 ftp |
| 1/10 | 16 - 18 | 1 | OPERATOR X | Windows (TRADEMARK) | VB Excel (TRADEMARK) |
| 1/10 | 13 - 17 | 2 | OPERATOR X | Linux (TRADEMARK) | J2EE1.4 ftp |

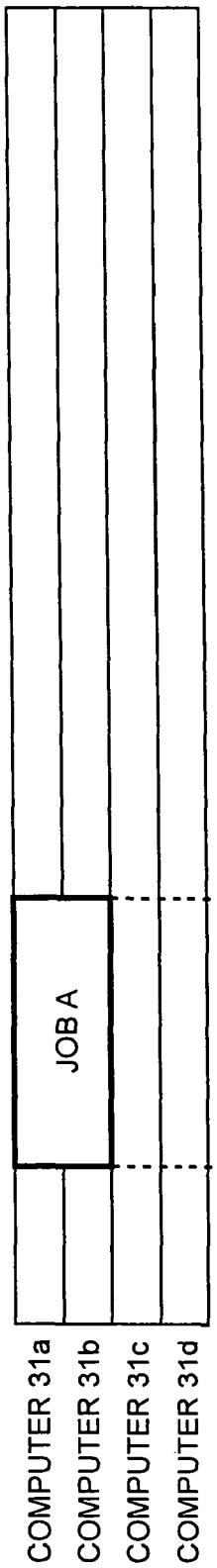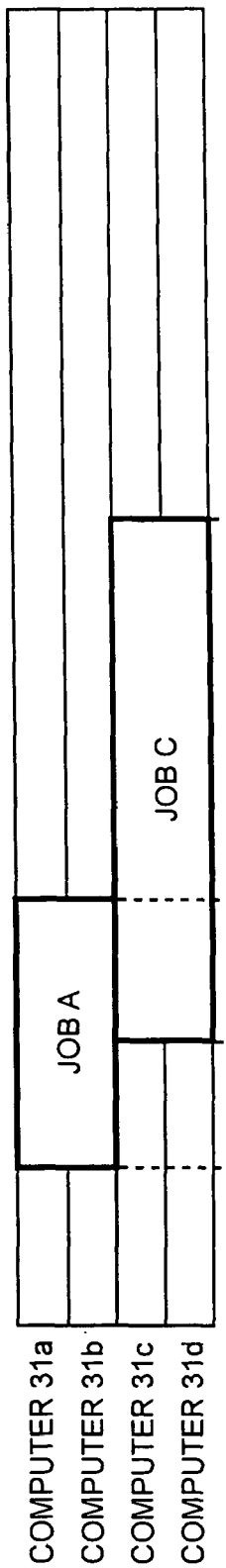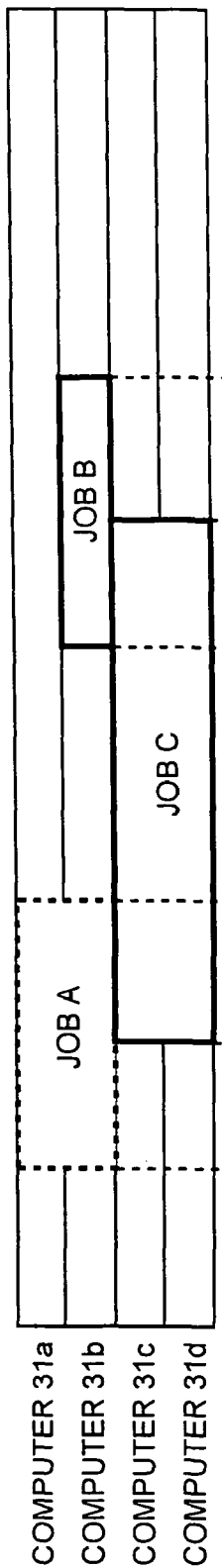

| COMPUTER | USE STATUS AT EXECUTION RESERVATION | DATA CENTER | USER |
| --- | --- | --- | --- |
| COMPUTER 3501 | USED | A | INTERNAL |
| COMPUTER 3502 | USED | A | INTERNAL |
| COMPUTER 3503 | USED | A | INTERNAL |
| COMPUTER 3504 | USED | A | INTERNAL |
| COMPUTER 3505 | USED | A | INTERNAL |
| COMPUTER 3506 | USED | A | INTERNAL |
| COMPUTER 3507 | USED | A | INTERNAL |
| COMPUTER 3508 | UNUSED | A | EXTERNAL |
| COMPUTER 3509 | UNUSED | A | EXTERNAL |
| COMPUTER 3510 | UNUSED | A | EXTERNAL |
| COMPUTER 3511 | UNUSED | A | EXTERNAL |
| COMPUTER 3512 | UNUSED | A | EXTERNAL |
| COMPUTER 3513 | USED | B | INTERNAL |
| COMPUTER 3514 | USED | B | INTERNAL |
| COMPUTER 3515 | USED | B | INTERNAL |
| COMPUTER 3516 | USED | B | INTERNAL |
| COMPUTER 3517 | USED | B | INTERNAL |
| COMPUTER 3518 | USED | B | EXTERNAL |
| COMPUTER 3519 | USED | B | EXTERNAL |
| COMPUTER 3520 | UNUSED | B | EXTERNAL |
| COMPUTER 3521 | UNUSED | B | EXTERNAL |
| COMPUTER 3522 | UNUSED | B | EXTERNAL |
| COMPUTER 3523 | UNUSED | B | EXTERNAL |
| COMPUTER 3524 | UNUSED | B | EXTERNAL |

FIG. 10

| COMPUTER | USE STATUS AT EXECUTION START | DATA CENTER | USER |
|---|---|---|---|
| COMPUTER 3501 | USED | A | INTERNAL |
| COMPUTER 3502 | USED | A | INTERNAL |
| COMPUTER 3503 | UNUSED | A | EXTERNAL |
| COMPUTER 3504 | UNUSED | A | EXTERNAL |
| COMPUTER 3505 | UNUSED | A | EXTERNAL |
| COMPUTER 3506 | UNUSED | A | EXTERNAL |
| COMPUTER 3507 | UNUSED | A | EXTERNAL |
| COMPUTER 3508 | UNUSED | A | EXTERNAL |
| COMPUTER 3509 | UNUSED | A | EXTERNAL |
| COMPUTER 3510 | UNUSED | A | EXTERNAL |
| COMPUTER 3511 | UNUSED | A | EXTERNAL |
| COMPUTER 3512 | UNUSED | A | EXTERNAL |
| COMPUTER 3513 | USED | B | INTERNAL |
| COMPUTER 3514 | USED | B | INTERNAL |
| COMPUTER 3515 | USED | B | INTERNAL |
| COMPUTER 3516 | USED | B | INTERNAL |
| COMPUTER 3517 | USED | B | INTERNAL |
| COMPUTER 3518 | USED | B | EXTERNAL |
| COMPUTER 3519 | USED | B | EXTERNAL |
| COMPUTER 3520 | UNUSED | B | EXTERNAL |
| COMPUTER 3521 | UNUSED | B | EXTERNAL |
| COMPUTER 3522 | UNUSED | B | EXTERNAL |
| COMPUTER 3523 | UNUSED | B | EXTERNAL |
| COMPUTER 3524 | UNUSED | B | EXTERNAL |

FIG. 11

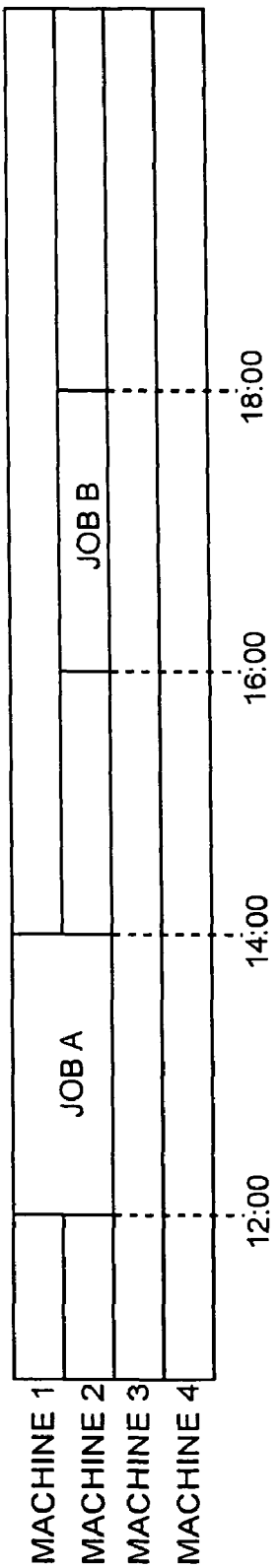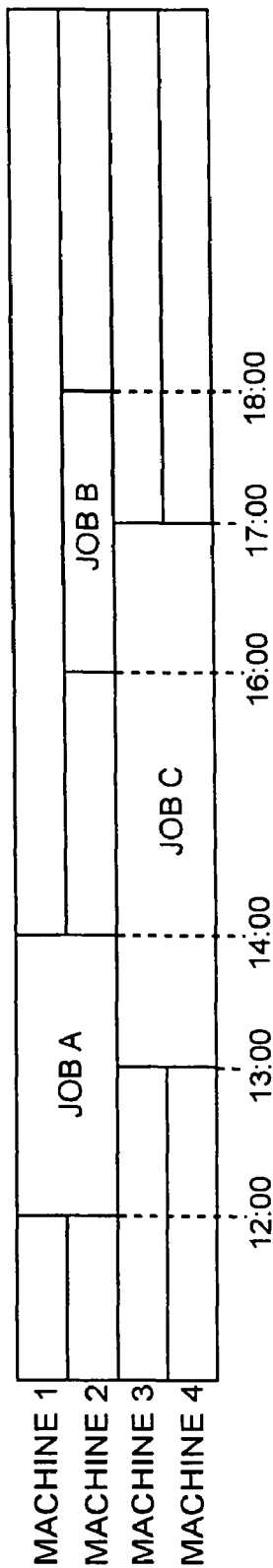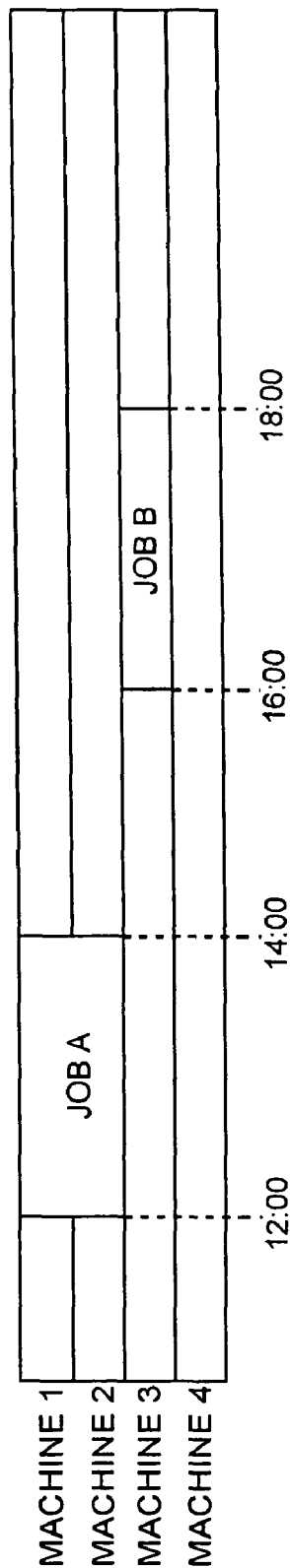

METHOD OF ASSIGNING AVAILABLE RESOURCES FOR INTERNAL AND EXTERNAL USERS AT START TIME OF SCHEDULED TIME PERIOD BASED ON PROGRAM RESERVATIONS INFORMATION

CROSS-REFERENCE TO RELATED APPLICATIONS

The present application claims priority upon Japanese Patent Application No. 2004-165576 filed on Jun. 3, 2004, which is herein incorporated by reference.

BACKGROUND OF THE INVENTION

1. Field of the Invention

The present invention relates to a method, apparatus, and program of making reservations for execution of programs, and a program execution system.

2. Description of the Related Art

Among computing systems having grid computing technology applied thereto are systems comprising an apparatus of making reservations for execution of jobs, which apparatus can access a so-called resource pool containing a plurality of computers (resources) that execute jobs (programs) of this computation. This apparatus of making reservations for execution of jobs comprises a job reservation information management table, and has a function to assign computers of the resource pool to jobs based on this table. The job reservation information management table contains table data wherein each job is associated with the number of computers required for execution of a job and an execution scheduled time as job reservation information. Such technology is disclosed in, for example, Japanese Patent Application Laid-open Publication No. 2002-318791.

As illustrated in, for example, a time diagram of FIG. 12A, the reservation status of computers (machines 1 to 4) is considered where machines 1 and 2 are reserved for the period of 12:00 to 14:00 for job A and machine 2 is reserved for the period of 16:00 to 18:00 for job B. In this case, the job reservation information management table is configured such that machines 1 and 2 are to be assigned to job A for the period of 12:00 to 14:00 and machine 2 is to be assigned to job B for the period of 16:00 to 18:00.

For this reservation status it is possible to execute, for example, job C that uses two machines for four hours, from 13:00. By making this reservation for job C, the reservation status is updated to a reservation status illustrated in a time diagram of FIG. 12B. Note that it is assumed that all machines 1 to 4 are equal in computation capability.

In the above computing system, reservations for jobs are made by specifically assigning computers to the jobs in the job reservation information management table. For example, in the case where job B is assigned to machine 3 but not machine 1 or 2 as illustrated in a time diagram of FIG. 12C, the problem that reservations for job C cannot be made occurs due to the premise that the same computer is consecutively used. This means that the computers are not being efficiently used.

SUMMARY OF THE INVENTION

The present invention was made in view of the above problem, and an object of the present invention is to enable the execution of jobs using resources efficiently.

The invention to solve the above problem is a program execution reservation method of assigning necessary resources to programs based on a program reservation information management table in which each of the programs is associated with a necessary resource quantity for execution of the program and execution scheduled time period as program reservation information, the method comprising, when the program reservation information is entered through a terminal, referring to a free resource quantity management table in which available resource quantities are associated with respective time periods, and acquiring the available resource quantity for the execution scheduled time period of the program reservation information, and determining whether the available resource quantity acquired is at or above the necessary resource quantity of the program reservation information; and, when having determined that the available resource quantity acquired is at or above the necessary resource quantity of the program reservation information, subtracting the necessary resource quantity from the available resource quantity, and writing the subtracting result as a new value of the available resource quantity into the free resource quantity management table, and writing the program reservation information into the program reservation information management table to update it.

In this program execution reservation method, preferably the program reservation information further includes information about an operating system and software necessary for execution of the program, and the method preferably further comprises referring to a preparation period management table in which each combination of an operating system and software is associated with a preparation period necessary for installing them in one of the resources, and acquiring the preparation period for the execution of the program for the program reservation information, and setting a new start time to earlier by the preparation period than the start time of the execution scheduled time period.

The program execution reservation method may further comprise, at the start time of the execution scheduled time period, referring to a resource use status management table in which each resource is associated with information about whether or not it is being used, and arbitrarily assigning the program a same number of any resources as the corresponding necessary resource quantity in the updated program reservation information management table from among available ones at the start time of the resources.

Alternatively, the program execution reservation method may further comprise, at the start time of the execution scheduled time period, referring to a resource use status management table in which each resource is associated with information about whether or not it is being used, and restrictively assigning the program a same number of particular resources as the corresponding necessary resource quantity in the updated program reservation information management table from among available ones at the start time of the resources.

In the foregoing program execution reservation method, the resource quantity may be the number of computers as resources.

The foregoing method may be a program execution reservation method wherein a plurality of the resources are separated into a plurality of data centers to which the resources belong and resources of each of the data centers are separated into for internal users and for external users, wherein corresponding to the separation, the program reservation information management table and the free resource quantity management table are each separated into for internal users and for external users, wherein the resource use status management table has each resource associated with information indicating one of the data centers and information indicating for internal users or for external users in addition to the information about whether or not it is being used, and wherein the particular resources are selected from among the resources for external users listed in the resource use status management table such that the particular resources are resources belonging to a given one of the data centers only if possible.

In the foregoing program execution reservation method, in each of the data centers, the ratio of the number of the resources for internal users to the number of the resources for external users may be variable with time.

Furthermore, the invention to solve the above problem is a program execution reservation apparatus which has a program reservation information management table in which each of programs is associated with a necessary resource quantity for execution of the program and execution scheduled time period as program reservation information, and which assigns necessary resources to the programs based on the program reservation information management table, the apparatus comprising a free resource quantity management table in which available resource quantities are associated with respective time periods; a reservation acceptance/denial determining section that, when the program reservation information is entered through a terminal, referring to the free resource quantity management table, acquires the available resource quantity for the execution scheduled time period of the program reservation information, and determines whether the available resource quantity acquired is at or above the necessary resource quantity of the program reservation information; and a table updating section that, when having determined that the available resource quantity acquired is at or above the necessary resource quantity of the program reservation information, subtracts the necessary resource quantity from the available resource quantity, and writes the subtracting result as a new value of the available resource quantity into the free resource quantity management table, and writes the program reservation information into the program reservation information management table.

Moreover, the invention to solve the above problem is a program execution reservation program for causing a program execution reservation apparatus having a program reservation information management table in which each of programs is associated with a necessary resource quantity for execution of the program and execution scheduled time period as program reservation information to perform a program execution reservation method of assigning necessary resources to the programs based on the program reservation information management table, the program comprising, when the program reservation information is entered through a terminal, referring to a free resource quantity management table in which available resource quantities are associated with respective time periods, and acquiring the available resource quantity for the execution scheduled time period of the program reservation information, and determining whether the available resource quantity acquired is at or above the necessary resource quantity of the program reservation information; and when having determined that the available resource quantity acquired is at or above the necessary resource quantity of the program reservation information, subtracting the necessary resource quantity from the available resource quantity, and writing the subtracting result as a new value of the available resource quantity into the free resource quantity management table, and writing the program reservation information into the program reservation information management table to update it.

Yet further, the invention to solve the above problem is a program execution system which has a resource pool containing resources to execute programs; a program execution reservation apparatus having a program reservation information management table in which each of programs is associated with a necessary resource quantity for execution of the program and execution scheduled time period as program reservation information, and a resource assigning section that assigns necessary resources to the programs based on the program reservation information management table; and a terminal to enter the program reservation information therethrough, wherein the program execution reservation apparatus further comprising a free resource quantity management table in which available resource quantities are associated with respective time periods; a resource use status management table in which each resource is associated with information about whether or not it is being used; a reservation acceptance/denial determining section that, when the program reservation information is entered through the terminal, referring to the free resource quantity management table, acquires the available resource quantity for the execution scheduled time period of the program reservation information, and determines whether the available resource quantity acquired is at or above the necessary resource quantity of the program reservation information; and a table updating section that, when having determined that the available resource quantity acquired is at or above the necessary resource quantity of the program reservation information, subtracts the necessary resource quantity from the available resource quantity, and writes the subtracting result as a new value of the available resource quantity into the free resource quantity management table, and writes the program reservation information into the program reservation information management table, and wherein the resource assigning section of the program execution reservation apparatus, at the start time of the execution scheduled time period, referring to the resource use status management table, assigns the program a same number of resources as the corresponding necessary resource quantity in the updated program reservation information management table from among available ones at the start time of the resources.

By the above means, jobs (programs) can be executed using resources efficiently.

Features and objects of the present invention other than the above will become clear by reading the description of the present specification with reference to the accompanying drawings.

BRIEF DESCRIPTION OF THE DRAWINGS

For more complete understanding of the present invention and the advantages thereof, reference is now made to the following description taken in conjunction with the accompanying drawings wherein:

FIG. 2A is a chart showing an example of a job reservation information management table of the first embodiment;

FIG. 2B is a chart showing an example of a free resource quantity management table of the first embodiment;

FIG. 2C is a chart showing an example of a preparation period management table of the first embodiment;

FIG. 2D is a chart showing an example of a resource use status management table of the first embodiment;

FIG. 7A is a time diagram showing an example of resource assignment of the first embodiment;

FIG. 7B is a time diagram showing an example of resource assignment of the first embodiment;

FIG. 7C is a time diagram showing an example of resource assignment of the first embodiment;

FIG. 10 is a chart showing an example of a resource use status management table at job execution reservation of the second embodiment;

FIG. 11 is a chart showing an example of the resource use status management table at job execution start of the second embodiment;

FIG. 12A is a time diagram showing an example of resource assignment;

FIG. 12B is a time diagram showing an example of resource assignment; and

FIG. 12C is a time diagram showing an example of resource assignment.

DETAILED DESCRIPTION OF THE INVENTION

At least the following matters will be made clear by the explanation in the present specification and the description of the accompanying drawings.

First Embodiment

<<Job Execution Reservation Apparatus>>

Figure 1:
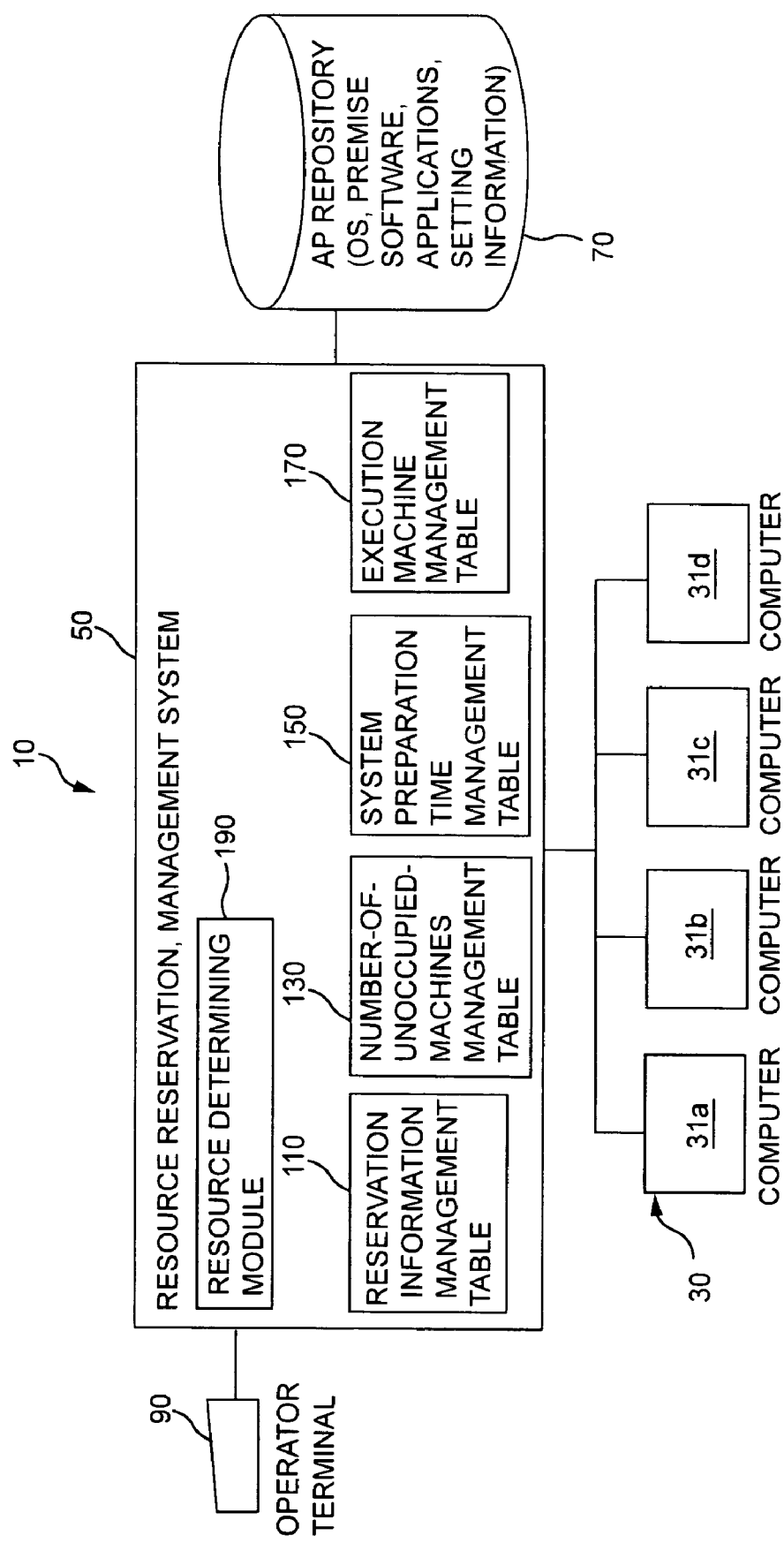
FIG. 1 is a block diagram showing an example of the configuration of a job execution system of a first embodiment.

As illustrated in a block diagram of FIG. 1, a grid computing system (program execution system) 10 of the present embodiment comprises essentially a resource pool 30 containing a plurality of computers (resources) 31a, 31b, 31c, 31d for executing grid computation jobs, and a resource reservation management apparatus (program execution reservation apparatus) 50. Note that although being four in FIG. 1, the number of the computers 31 is not limited to this, but can be any number as long as being two or greater. Furthermore, it is assumed that all computers 31 of the present embodiment are the same in capabilities.

The resource reservation/management apparatus 50 comprises operating systems (OS) that are to be installed in the computers 31 when jobs are executed, premise software, applications (AP), an AP repository 70 storing setting information and the like, and an operator terminal (or terminal) 90 for an operator to enter job reservation information and the like therethrough. This resource reservation/management apparatus 50 is an information processing apparatus that makes reservations for the execution of jobs based on the job reservation information and has a function to cause computers 31 to execute jobs.

Note that the resource reservation/management apparatus 50 of the present embodiment is not limited to a separate information processing apparatus, but may be embodied as software installed in one of computers 31 that causes the computer to operate as the resource reservation/management apparatus 50.

The resource reservation/management apparatus 50 further comprises a reservation information management table (program reservation information management table) 110, a number-of-unoccupied-machines management table (free resource quantity management table) 130, a system preparation time management table (preparation period management table) 150, and an execution machine management table (resource use status management table) 170. In this embodiment, a description will be made taking jobs as an example, but the same applies to programs, objects, processes, and threads.

As illustrated in a table of FIG. 2A, the reservation information management table 110 is configured such that, for each operator information piece, the number of to-be-reserved computers 31 (resource quantity) and a job execution scheduled date and time (execution scheduled time period), an OS and premise software necessary for the job, an application, setting information, and the like as job reservation information, which are associated with each other. In FIG. 2A, for example, an operator X has made a reservation of two computers 31 for the period of 12:00 to 14:00 on January 10. Furthermore, the job for this reservation is to be executed using premise software, "J2EE1.4" and "ftp", on an OS, "Linux (Trademark)". Note that although in the present embodiment the reservation information management table 110 is configured on a per operator information piece basis, one configured on a per operator-requested-job basis or on a per application-for-the-job basis would be equivalent thereto. The point is that a resource quantity and execution scheduled time period need only be associated with each information piece identifying a job in the present embodiment.

As illustrated in a table of FIG. 2B, the number-of-unoccupied-machines management table 130 is configured so that the number of computers 31 available (resource quantity) is associated with each date and time (term). In FIG. 2B, for example, the number of unoccupied computers 31 is two for the period of 12:00 to 13:00 on January 10 and two for the period of 13:00 to 14:00 on January 10. Here, considering the number of all computers 31 in the resource pool 30 of the present embodiment being four, it matches the number of unoccupied computers 31 being two that in the reservation information management table 110, operator X has made reservations of two computers 31 each for both the period of 12:00 to 13:00 and the period of 13:00 to 14:00. That is, data of the number-of-unoccupied-machines management table 130 (FIG. 2B) matches data of the reservation information management table 110 (FIG. 2A).

As illustrated in a table of FIG. 2C, the system preparation time management table 150 is configured so that each combination of an OS and premise software of the above ones is associated with system preparation time (a preparation period) to install the OS and software in a computer 31. In FIG. 2C, time required for installing an OS, "Linux (Trademark)", and premise software, "J2EE1.4" and "ftp", in a computer 31 is 0.2 hours (12 minutes). And, time required for installing an OS, "Windows (Trademark)", and premise software, "VisualBasic (Trademark)" and "Excel (Trademark)", in a computer 31 is 0.4 hours (24 minutes).

As illustrated in a table of FIG. 2D, the execution machine management table 170 is configured so that each computer 31a, 31b, 31c, 31d is associated with whether or not it is being used at a current time (for example, at 12:48). In FIG. 2D, for example, two computers 31a, 31b are used for operator X at 12:48, and two computers 31c, 31d are not used (free) at 12:48. The operations of the computers 31 are based on the job reservation information. Hence, the two indicated as being used in FIG. 2D correspond to two computers 31 reserved by operator X for the period of 12:00 to 14:00 on January 10 in the reservation information management table 110 (FIG. 2A), and the two indicated as being not used in FIG. 2D correspond to two unoccupied computers 31 for the period of 12:00 to 13:00 on January 10 in the number-of-unoccupied-machines management table 130 (FIG. 2B).

Furthermore, as illustrated in the block diagram of FIG. 1, the resource reservation/management apparatus 50 of the present embodiment comprises a resource determining module (resource assigning section) 190 described later which assigns computers 31 to a job at an actual execution start date and time for the job.

<<<Job Execution Reservation and Job Execution>>>

Figure 3:
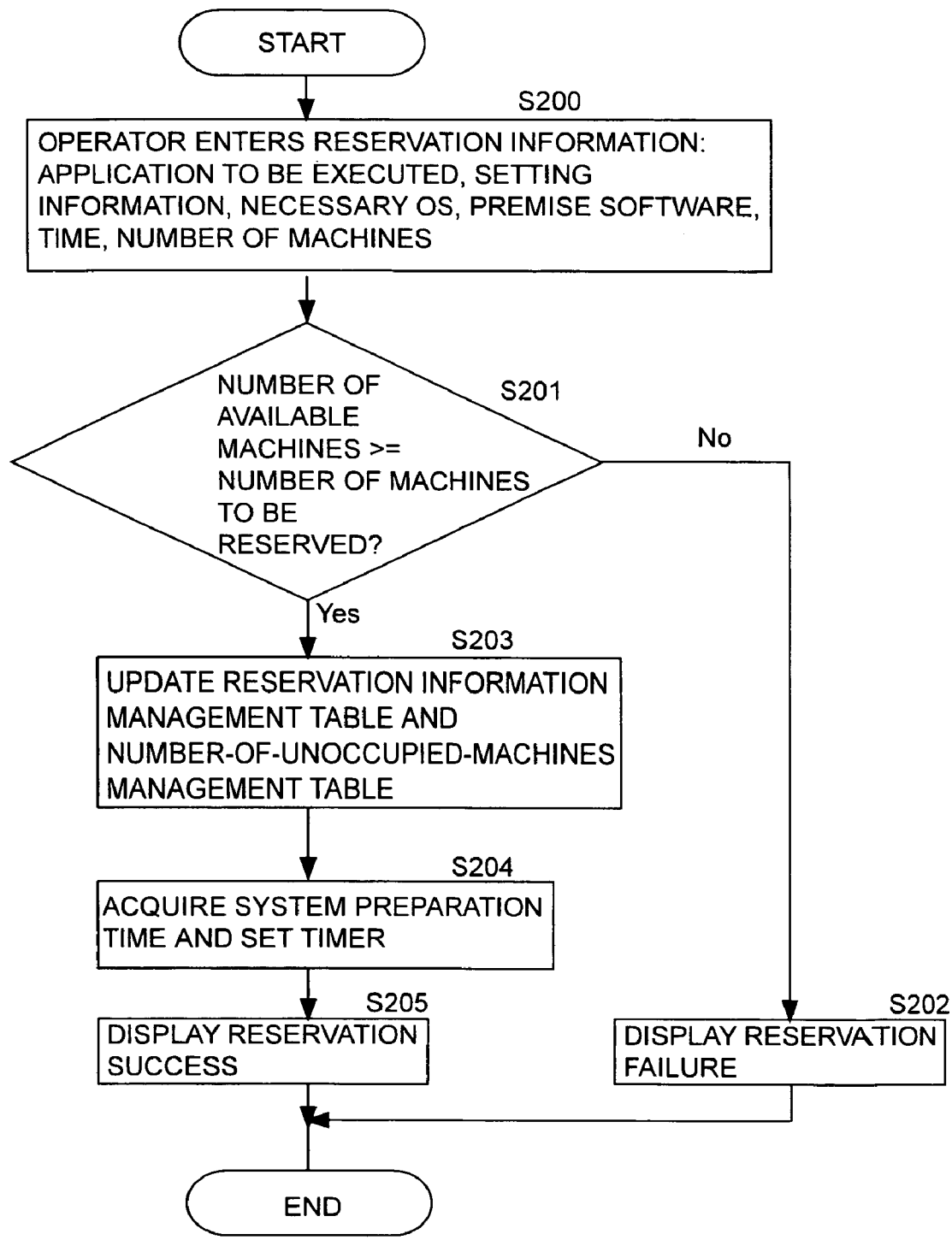
FIG. 3 is a flow chart showing an example of a processing procedure of a job execution reservation method of the first embodiment.

As illustrated in a flow chart of FIG. 3, first, operator X enters the designations of an application for job C to be executed, an OS, and premise software, and the number of computers 31 to be reserved and a date and time to be reserved for, which are job reservation information, into the resource reservation/management apparatus 50 of the grid computing system 10 through the operator terminal 90 (S200). In the present embodiment, it is assumed that the OS is "Linux (Trademark)", the premise software is "J2EE1.4" and "ftp", the number of computers 31 to be reserved is two, and the date and time to be reserved for is the period of 13:00 to 17:00 on January 10. Note that in the present embodiment, reservations are already made by the same operator X for job A and job B, but computers 31 are not yet assigned to jobs as described later.

Referring to the number-of-unoccupied-machines management table 130 (FIG. 2B), the resource reservation/management apparatus 50 acquires the number of computers 31 available at the reservation date and time specified in the job reservation information and determines whether or not the number is at or above the number of ones to be reserved specified in the job reservation information (S201).

According to FIG. 2B, the number of computers available for the period of 13:00 to 14:00 on January 10 is two, the number of computers available for the period of 14:00 to 15:00 is four, the number of computers available for the period of 15:00 to 16:00 is four, and the number of computers available for the period of 16:00 to 17:00 is three. Thus, the number of computers 31 available for all the period of 13:00 to 17:00 is two, which is equal to the number of computers 31 to be reserved (S201: YES).

If the number of computers available is less than the number of computers to be reserved (S201: NO), the resource reservation/management apparatus 50 displays on an appropriate display to the effect that the reservation failed (S202) and finishes processing.

Next, the resource reservation/management apparatus 50 subtracts two, the number of computers to be reserved, from two, the number of computers available for the period of 13:00 to 14:00, in data for January 10 in the number-of-unoccupied-machines management table 130 (FIG. 2B) to produce zero (subtracting result), subtracts two, the number of computers to be reserved, from four, the number of computers available for the period of 14:00 to 15:00, to produce two (subtracting result), subtracts two, the number of computers to be reserved, from four, the number of computers available for the period of 15:00 to 16:00, to produce two (subtracting result), and subtracts two, the number of computers to be reserved, from three, the number of computers available for the period of 16:00 to 17:00, to produce one (subtracting result). By writing the subtracting results as new numbers of computers available, the number-of-unoccupied-machines management table 130 is updated (see FIG. 4). By writing the above job reservation information into the reservation information management table 110 (FIG. 2A), the resource reservation/management apparatus 50 updates it (see FIG. 5; S203).

Next, referring to the system preparation time management table 150 (FIG. 2C), the resource reservation/management apparatus 50 acquires system preparation time, 0.2 hours (=12 minutes), associated with the combination (pattern 1) of the OS and premise software of the job reservation information. Furthermore, the resource reservation/management apparatus 50 sets the actual execution start date and time for job C to 12:48 on January 10 that is twelve minutes before 13:00 on January 10 and sets an appropriate timer to call up the resource determining module 190 at that date and time (S204).

Finally, the resource reservation/management apparatus 50 displays on an appropriate display to the effect that the reservation has been made (S205) and finishes processing.

Figures 4, 5, 6:
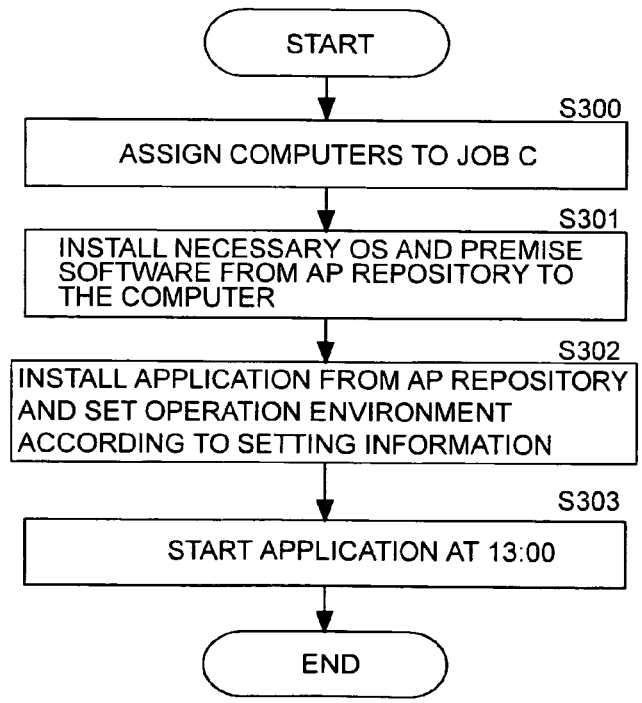
FIG. 4 is a chart showing another example of the free resource quantity management table of the first embodiment.
FIG. 5 is a chart showing another example of the job reservation information management table of the first embodiment.
FIG. 6 is a flow chart showing an example of a processing procedure of a job execution method of the first embodiment.

As illustrated in a flow chart of FIG. 6, referring to the execution machine management table 170, the resource reservation/management apparatus 50 selects any two computers from unoccupied computers 31c, 31d based on the job reservation information by use of the operation of the resource determining module 190 called up at 12:48 on January 10 as mentioned above, and assigns them to job C (S300). Note that in the present embodiment, there are two unoccupied computers 31c, 31d and thus, any two computers selected are computers 31c, 31d.

Next, according to the job reservation information, the resource reservation/management apparatus 50 reads out the OS and premise software necessary for job C from the AP repository 70 and installs them in computers 31c, 31d (S301).

Next, according to the job reservation information, the resource reservation/management apparatus 50 reads out the application necessary for job C from the AP repository 70, installs it in computers 31c, 31d, and sets its operation environment according to the setting information (S302).

Finally, the resource reservation/management apparatus 50 starts the application at 13:00 (S303).

Note that the above step S201 constitutes a determining step of the present embodiment, step S203 constitutes an updating step of the present embodiment, step S204 constitutes a step of setting a start time of the present embodiment, and step S300 constitutes an arbitrarily assigning step of the present embodiment. Moreover, an appropriate CPU provided in the resource reservation/management apparatus 50 and an appropriate program (program execution reservation program) to cause the CPU to perform the process of S201 constitutes a reservation acceptance/denial determining section of the present embodiment. Furthermore, the appropriate CPU provided in the resource reservation/management apparatus 50 and the appropriate program (program execution reservation program) to cause the CPU to perform the process of S203 constitutes a table updating section of the present embodiment.

<<<Resource Assignment>>>

By the resource reservation/management apparatus 50 of the present embodiment, the reservation information management table 110 of, for example, FIG. 5 is created through the determination of step S201 so as to secure consistency with the number-of-unoccupied-machines management table 130 of FIG. 4. According to the reservation information management table 110, job A is to be executed using two computers 31 during the period of 12:00 to 14:00 on January 10; job B is to be executed using one computer 31 during the period of 16:00 to 18:00 on the same day; and job C is to be executed using two computers 31 during the period of 13:00 to 17:00 on the same day.

Furthermore, by the resource reservation/management apparatus 50 of the present embodiment, in step S300, each job is assigned computers 31 at the actual execution start date and time for the job.

As illustrated in a time diagram of FIG. 7A, when job A is assigned two computers 31 at 12:00 (actually 11:48) on January 10 based on the number-of-unoccupied-machines management table 130 (FIG. 5), job B and job C are not yet assigned a computer 31. Hence, any two of the four computers 31 can be assigned to job A. In FIG. 7A, these two computers are computers 31a, 31b.

As illustrated in a time diagram of FIG. 7B, when job C is assigned two computers 31 at 13:00 (actually 12:48) on January 10 based on the number-of-unoccupied-machines management table 130 (FIG. 5), two assignable computers are computers 31c and 31d.

As illustrated in a time diagram of FIG. 7C, when job B is assigned one computer 31 at 16:00 (actually 15:36) on January 10 based on the number-of-unoccupied-machines management table 130 (FIG. 5), either of computers 31a, 31b released from job A can be assigned to job B. In FIG. 7C, this computer is computer 31b.

As described above, the reservation information management table 110 (FIG. 5) is created so as to secure consistency with the number-of-unoccupied-machines management table 130 (FIG. 4), and each job is assigned computers 31 at the actual execution start date and time for the job. By this means, the jobs are executed using the computers 31 efficiently.

Moreover, by the resource reservation/management apparatus 50 of the present embodiment, execution preparation for each job is started at the actual execution start date and time for the job. Hence, no job finishes later than its scheduled end time. Thus, the jobs are executed using the computers 31 efficiently as scheduled.

Second Embodiment

Figure 8:
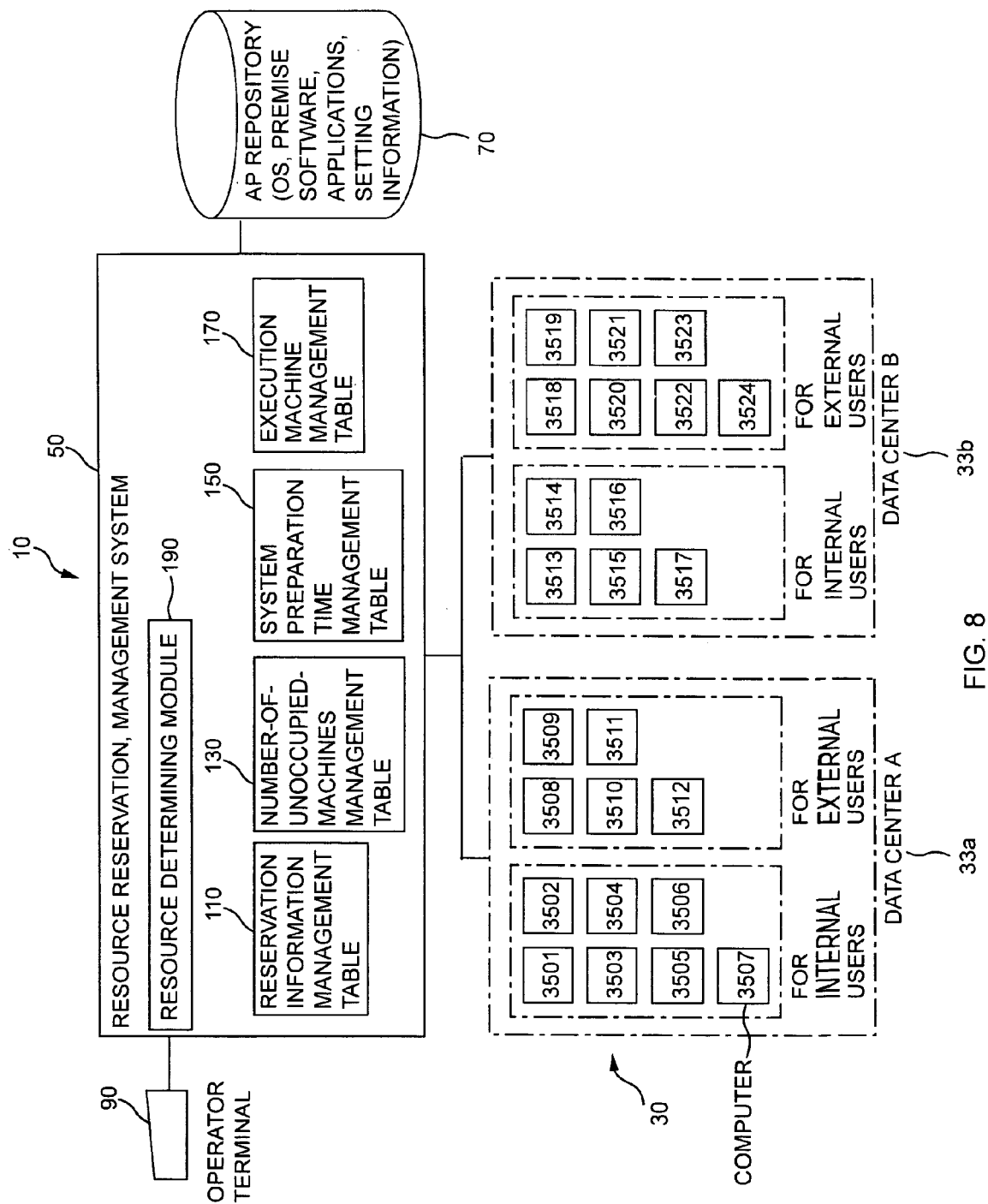
FIG. 8 is a block diagram showing an example of the configuration of a job execution system of a second embodiment.

As illustrated in a block diagram of FIG. 8, in the present embodiment, the resource pool 30 of the above embodiment is separated into a plurality of data centers 33, each of which comprises computers 35 for internal users and for external users.

The resource reservation/management apparatus 50 assigns jobs for internal users of each data center 33 computers 35 for internal users of the data center 33 according to the above job execution reservation and execution method. In this case, the reservation information management table 110 and the number-of-unoccupied-machines management table 130 are created for the internal users of each data center 33 individually. By this means, the jobs for internal users of each data center 33 can be executed using the computers 35 for internal users of the data center 33 efficiently. That is, the same effect as produced in the above embodiment is produced in the present embodiment as well.

On the other hand, jobs for external users are assigned computers from among all computers 35 for external users regardless of which data center 33 they belong to. In this case, the reservation information management table 110 and the number-of-unoccupied-machines management table 130 are created for external users separately from those for internal users mentioned above.

As illustrated in pattern diagrams of FIGS. 9A and 9B, a job execution reservation method will be described wherein ones of the computers 35 (3501 to 3524) of data centers A33a and B33b are assigned to a job for an external user.

Figure 9A:
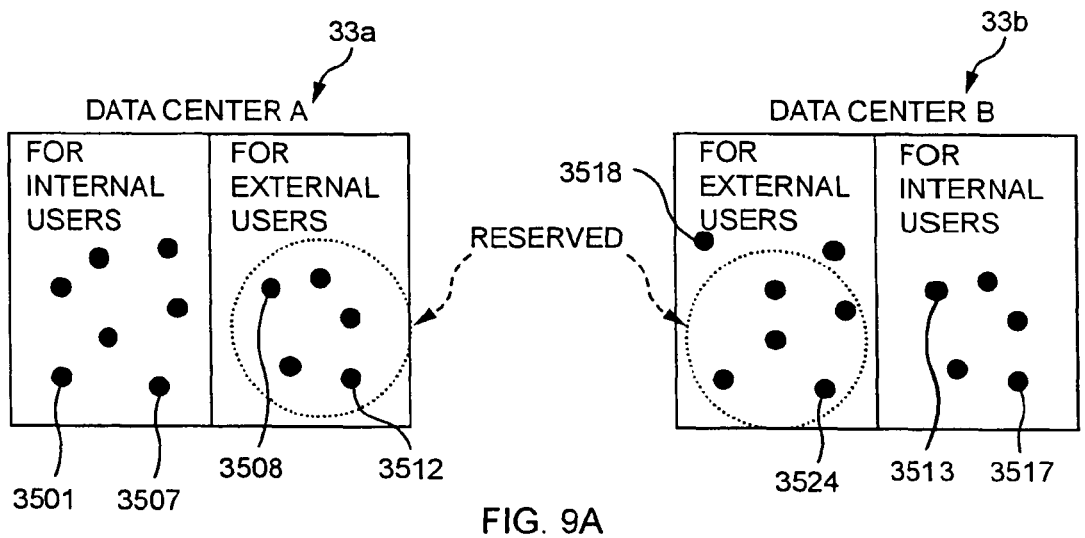
FIG. 9A is a pattern diagram showing an example of resource assignment at job execution reservation in the second embodiment.

It is assumed that when a reservation is made for a job for an external user, as shown in, e.g., FIG. 9A, seven for-internal-users computers 3501 to 3507 and five for-external-users computers 3508 to 3512 belong to data centers A33a, and five for-internal-users computers 3513 to 3517 and seven for-external-users computers 3518 to 3524 belong to data centers B33b. Here, as in the above embodiment, for the job for the external user, ten computers 35 are reserved for a given execution scheduled time.

As illustrated in a table of FIG. 10, when making an execution reservation, the execution machine management table 170 is configured so that the computers 3501 to 3524 are further associated with "A"/"B", information indicating which data center 33a, 33b it belongs to, and "internal"/"external", information for distinguishing users as well as the information about whether or not it is being used when making an execution reservation.

Here, suppose that, as illustrated in a table of FIG. 11, when starting the execution of the job for the external user, five of for-internal-users computers 3501 to 3507 of data center A33a become free and released to be available for external users. That is, in data center A33a, the ratio of the number of for-internal-users computers 35 to the number of for-internal-users computers 35 was 7:5 when making an execution reservation, and has changed to 2:10 when starting the execution of the job.

Figure 9B:
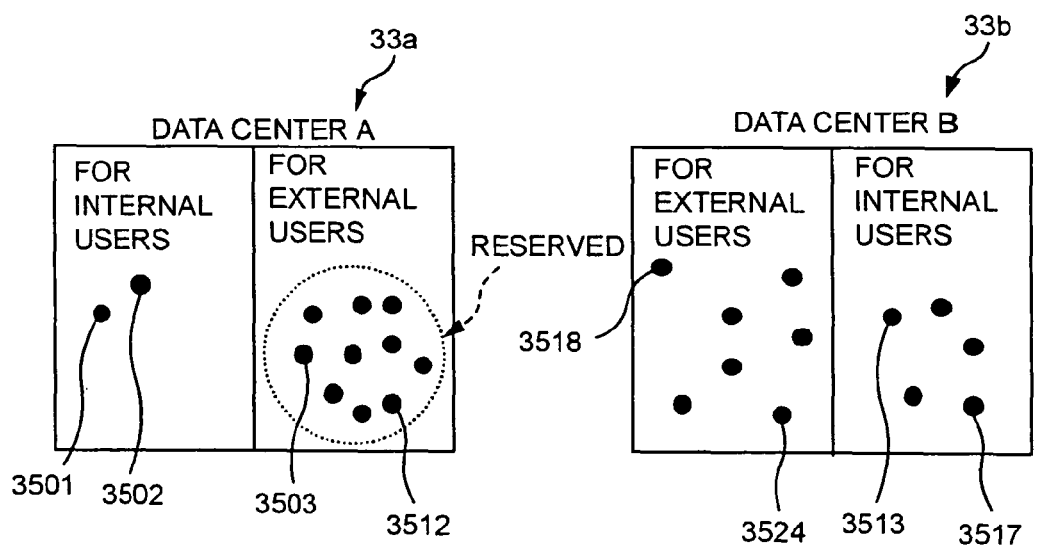
FIG. 9B is a pattern diagram showing an example of resource assignment at job execution start in the second embodiment.

Specifically, when starting the execution of the job for the external user, as shown in FIG. 9B, two for-internal-users computers 3501 and 3502 and ten for-external-users computers 3503 to 3512 belong to data center A33a, and five for-internal-users computers 3513 to 3517 and seven for-external-users computers 3518 to 3524 belong to data center B33b. In this way, in each data center 33, the number-of-computers ratio is variable with date and time.

If computers 35 must be specifically assigned to the job when making an execution reservation for the job for the external user, there would be no other choice but to choose ten computers 3508 to 3512 and 3520 to 3524 from both data centers A33a, B33b as illustrated in FIG. 9A.

On the other hand, the resource reservation/management apparatus 50 of the present embodiment specifically assigns computers 35 when starting the execution of the job for the external user. Hence, if the reservation status has changed from FIG. 9A to FIG. 9B, ten computers can be selected from for-external-users computers 3503 to 3512 and 3518 to 3524. Thus, the ten computers can be selected from only data center A33a. Only if possible, by selecting the ten computers from computers 3503 to 3512 belonging to one data center A33a as above, the job can be executed efficiently without using the broad network. By this means, the overall utilization rate of data centers 33 can be improved.

Moreover, the effect is produced that when starting the execution of a job, most appropriate computers 35 can be used in terms of network conditions between computers 3501 to 3524, cost, and the like.

Note that the above selecting and assigning of ten computers from computers 3503 to 3512 belonging to one data center A33a only if possible constitutes a restrictively assigning step of the present embodiment.

The above embodiments of the invention are provided to facilitate the understanding of the present invention and not intended to limit the present invention. It should be understood that various changes and alterations can be made therein without departing from the spirit and scope of the present invention and the present invention includes such equivalents.

Although, in the above embodiments, resources for executing jobs are computers 31, 35, the present invention is not limited to this, but the resource may be embodied as anything such as CPU or memory associated with the execution of a job and to be assigned to the job.

What is claimed is:

1. A program execution reservation method of assigning necessary resources to programs based on a program reservation information management table in which each of the programs is associated with program reservation information comprising a necessary resource quantity for execution of the program and an execution scheduled time period, the method comprising:

receiving program reservation information for a first program via a terminal comprising an entered necessary resource quantity and an entered execution scheduled time period, and in response thereto, referring to a free resource quantity management table comprising available resource quantities and associated respective time periods, acquiring an available resource quantity based on the entered execution scheduled time period and determining whether the available resource quantity acquired is at or above the entered necessary resource quantity;

when it is determined that the available resource quantity acquired is at or above the entered necessary resource quantity, then subtracting the entered necessary resource quantity from the available resource quantity acquired, storing a result of the subtracting as a new value for the available resource quantity into the free resource quantity management table, and writing the received program reservation information to update an entry in the program reservation information management table corresponding to the first program; and at a start time of the entered execution scheduled time period corresponding to the first program, referring to a resource use status management table for a plurality of resources, wherein each resource is associated with information about whether or not it is being used, and restrictively assigning the first program a same number of particular resources equal to the entered necessary resource quantity corresponding to the first program that is stored in the updated program reservation information management table, the assigning of the particular resources being made from among resources available at the start time of the entered execution scheduled time period, wherein the entered necessary resource quantity is a number of computers as resources, wherein the resources are located among a plurality of data centers and the resources in each data center are separated for internal users and for external users, wherein the program reservation information management table and the free resource quantity management table are each separated into for internal users and for external users, wherein the resource use status management table further includes information about whether said each resource is for internal users or for external users, wherein the particular resources are selected from among resources that are for external users listed in the resource use status management table such that the particular resources are resources belonging to a given one of the data centers only if possible.

2. The program execution reservation method of claim 1, wherein the program reservation information further includes information specifying an operating system and software necessary for execution of the program, the method further comprising:

referring to a preparation period management table in which each combination of an operating system and software is associated with a preparation period necessary for installing them in one of the resources, acquiring a preparation period that corresponds to the operating system and software that is necessary for the execution of the program, and setting a new start time to earlier by the preparation period than the start time of the entered execution scheduled time period.

3. The program execution reservation method of claim 1, wherein in each of the data centers, the ratio of a number of the resources for internal users to a number of the resources for external users is variable with time.

4. A program execution reservation apparatus for assigning necessary resources to programs comprising:

a computer system; and a data storage device in communication with the computer system, the data storage device having stored therein a program reservation information management table in which each of the programs is associated with program reservation information comprising a necessary resource quantity for execution of the program and an execution scheduled time period;

the data storage device further having stored therein a free resource quantity management table comprising available resource quantities and associated respective time periods;

the computer system including a reservation acceptance/denial determining section which, upon receiving program reservation information for a first program via a terminal comprising an entered necessary resource quantity and an entered execution scheduled time period, refers to the free resource quantity management table, acquires an available resource quantity based on the entered execution scheduled time period and determines whether the available resource quantity acquired is at or above the entered necessary resource quantity; and the computer system further including a table updating section which, upon determining that the available resource quantity acquired is at or above the entered necessary resource quantity, subtracts the entered necessary resource quantity from the available resource quantity acquired, and writes the result of the subtracting as a new value for the available resource quantity into the free resource quantity management table, and writes the received program reservation information into an entry in the program reservation information management table corresponding to the first program, wherein at a start time of the entered execution scheduled time period corresponding to the first program, the computer system refers to a resource use status management table for a plurality of resources, wherein each resource is associated with information about whether or not it is being used, and the computer system restrictively assigns the first program a same number of particular resources equal to the entered necessary resource quantity corresponding to the first program that is stored in the updated program reservation information management table, the assigning of the particular resources being made from among resources available at the start time of the entered execution scheduled time period, wherein the entered necessary resource quantity is a number of computers as resources, wherein the resources are located among a plurality of data centers and the resources in each data center are separated for internal users and for external users, wherein the program reservation information management table and the free resource quantity management table are each separated into for internal users and for external users, wherein the resource use status management table further includes information about whether said each resource is for internal users or for external users, wherein the particular resources are selected from among resources that are for external users listed in the resource use status management table such that the particular resources are resources belonging to a given one of the data centers only if possible.

5. The program execution reservation apparatus of claim 4, wherein in each of the data centers, the ratio of a number of the resources for the internal users to a number of the resources for the external users is variable with time.

6. A computer readable storage medium having stored thereon computer program instructions, the computer program instructions causing a computer apparatus to perform a method for program execution reservation, the computer apparatus having stored therein a program reservation information management table in which each of programs is associated with program reservation information comprising a necessary resource quantity for execution of the program and execution scheduled time period in order to assign necessary resources to the programs based on the program reservation information management table, the method comprising:

receiving program reservation information for a first program via a terminal comprising an entered necessary resource quantity and an entered execution scheduled time period, and in response thereto referring to a free resource quantity management table comprising available resource quantities and associated respective time periods, acquiring an available resource quantity based on the entered execution scheduled time period, and determining whether the available resource quantity acquired is at or above the entered necessary resource quantity;

when it is determined that the available resource quantity acquired is at or above the entered necessary resource quantity, then subtracting the entered necessary resource quantity from the available resource quantity acquired, storing a result of the subtracting as a new value for the available resource quantity into the free resource quantity management table, and writing the received program reservation information to update an entry in the program reservation information management table corresponding to the first program; and at a start time of the entered execution scheduled time period corresponding to the first program, referring to a resource use status management table for a plurality of resources, wherein each resource is associated with information about whether or not it is being used, and restrictively assigning the first program a same number of particular resources equal to the entered necessary resource quantity corresponding to the first program that is stored in the updated program reservation information management table, the assigning of the particular resources being made from among resources available at the start time of the entered execution scheduled time period, wherein the entered necessary resource quantity is a number of computers as resources, wherein the resources are located among a plurality of data centers and the resources in each data center are separated for internal users and for external users, wherein the program reservation information management table and the free resource quantity management table are each separated into for internal users and for external users, wherein the resource use status management table further includes information about whether said each resource is for internal users or for external users, wherein the particular resources are selected from among resources that are for external users listed in the resource use status management table such that the particular resources are resources belonging to a given one of the data centers only if possible.

7. The program execution reservation method of claim 6, wherein in each of the data centers, the ratio of a number of the resources for the internal users to a number of the resources for the external users is variable with time.

8. A program execution system comprising:

a resource pool containing resources to execute programs;

a program execution reservation apparatus having a program reservation information management table in which each of programs is associated with program reservation information comprising a necessary resource quantity for execution of the program and execution scheduled time period, and a resource assigning section that assigns necessary resources to the programs based on the program reservation information management table; and a terminal to enter program reservation information therethrough, the program execution reservation apparatus further comprising:

a free resource quantity management table in which available resource quantities are associated with respective time periods;

a resource use status management table in which each resource is associated with information about whether or not it is being used;

a reservation acceptance/denial determining section which, upon receiving program reservation information for a first program via the terminal comprising an entered necessary resource quantity and an entered execution scheduled time period, refers to the free resource quantity management table, acquires an available resource quantity based on the entered execution scheduled time period, and determines whether the available resource quantity acquired is at or above the entered necessary resource quantity; and a table updating section which, upon determining that the available resource quantity acquired is at or above the entered necessary resource quantity, subtracts the entered necessary resource quantity from the available resource quantity acquired, and writes the result of the subtracting as a new value of the available resource quantity into the free resource quantity management table, and writes the received program reservation information into an entry in the program reservation information management table corresponding to the first program, and the resource assigning section of the program execution reservation apparatus, at a start time of the entered execution scheduled time period corresponding to the first program, referring to a resource use status management table for a plurality of resources, wherein each resource is associated with information about whether or not it is being used, and restrictively assigning the first program a same number of particular resources equal to the entered necessary resource quantity corresponding to the first program that is stored in the updated program reservation information management table, the assigning of the particular resources being made from among resources available at the start time of the entered execution scheduled time period, wherein the entered necessary resource quantity is a number of computers as resources, wherein the resources are located among a plurality of data centers and the resources in each data center are separated for internal users and for external users, wherein the program reservation information management table and the free resource quantity management table are each separated into for internal users and for external users, wherein the resource use status management table further includes information about whether said each resource is for internal users or for external users, wherein the particular resources are selected from among resources that are for external users listed in the resource use status management table such that the particular resources are resources belonging to a given one of the data centers only if possible.

9. The program execution system of claim 8, wherein in each of the data centers, the ratio of a number of the resources for the internal users to a number of the resources for the external users is variable with time.

* * * * *